US005983760A

United States Patent [19]

Clarke

[11] Patent Number: 5,983,760

[45] Date of Patent: Nov. 16, 1999

[54] INLINE SKATE KEY ASSEMBLY

[76] Inventor: Peter B. Clarke, 5A Sunrise Rd., Westport, Conn. 06880

[21] Appl. No.: 08/790,628

[22] Filed: Jan. 29, 1997

Related U.S. Application Data

[60] Provisional application No. 60/010,714, Jan. 29, 1996.

[51] Int. Cl.$^{6}$ .................. B25B 13/48

[52] U.S. Cl. .................. 81/436; 24/298

[58] Field of Search .................. 81/436, 439, 440; 7/167, 170; 24/3.1, 3.12, 3.6, 301, 302, 298, 265 H, 265 EC, 572, 588

[56] References Cited

U.S. PATENT DOCUMENTS

| | | | |
|---|---|---|---|
| D. 49,037 | 5/1916 | Parsons . | |
| D. 59,025 | 9/1921 | McCullough . | |
| 525,189 | 8/1894 | Devore | 81/436 |
| 872,048 | 11/1907 | Broad . | |
| 1,167,542 | 1/1916 | Bellows . | |
| 1,341,811 | 6/1920 | Lutz | 24/3.12 |
| 1,341,930 | 6/1920 | Roblin | 24/3.6 |
| 1,442,184 | 1/1923 | Smith . | |
| 3,604,232 | 9/1971 | Mosher | 70/457 |
| 3,688,349 | 9/1972 | Benk | 24/302 |
| 3,949,511 | 4/1976 | Goldhaft | 43/20 |
| 4,150,464 | 4/1979 | Tracy . | |
| 4,226,105 | 10/1980 | Wehrman | 24/3.6 |
| 4,306,434 | 12/1981 | Drake | 70/458 |
| 4,489,867 | 12/1984 | Schwemberger | 224/222 |
| 4,504,993 | 3/1985 | Gamble | 7/165 |
| 4,631,770 | 12/1986 | Goldberg | 7/167 |
| 4,774,736 | 10/1988 | Brawner et al. | 7/138 |
| 5,060,995 | 10/1991 | Goldstein et al. | 294/19.1 |
| 5,179,748 | 1/1993 | Lipic | 81/439 |
| 5,271,633 | 12/1993 | Hill, Jr. | 280/11.22 |
| 5,365,811 | 11/1994 | Chi | 81/439 |
| 5,425,485 | 6/1995 | Carlo | 24/298 |

FOREIGN PATENT DOCUMENTS

| | | | |
|---|---|---|---|
| 637927 | 5/1950 | United Kingdom | 81/440 |
| 859177 | 1/1961 | United Kingdom | 81/440 |
| 912058 | 12/1962 | United Kingdom | 81/440 |

*Primary Examiner*—David A. Scherbel
*Assistant Examiner*—Joni B. Danganan
*Attorney, Agent, or Firm*—Handal & Morofsky

[57] ABSTRACT

A skate key assembly for adjusting the wheels of an inline skate comprises an elongated one-piece key member of uniform hexagonal cross section including an intermediate S-shaped gripping member extending in one direction to a generally straight operating portion having a terminal end for insertion into the tightening mechanism of a wheel of the inline skate and extending in an opposite direction to an attachment portion oriented generally transverse of said operating portion. A carrier device in the form of a snap hook releasably attaches the assembly to the clothing of a user. A side release buckle includes a first buckle component attached to the carrier device, a second buckle component attached to the attachment portion of the key member, and an engagement mechanism selectively operable for releasably attaching the first buckle component to the second buckle component. The engagement mechanism is operable in one instance to attach the second buckle component to the first buckle component thereby safely attaching the key member to the clothing of the user and is operable in another instance to release the second buckle component from the first buckle component thereby freeing the key member for use in adjusting the wheels of the inline skate.

6 Claims, 2 Drawing Sheets

INLINE SKATE KEY ASSEMBLY

This application claims benefit of Provisional application Ser. No. 60/010,714, filed Jan. 29, 1996.

BACKGROUND OF THE INVENTION

1. Field of the Invention

This invention relates generally to a tool for operating on components of inline skates and to an assembly enabling the tool to be carried on the person of the skater yet be readily yielded for use whenever appropriate.

2. Description of the Prior Art

In recent years, inline skating has become a sport of vast proportions. Skates are subjected to wear and tear as a result of normal usage and their users often take them long distances from a home location. As a result, it is often necessary to perform routine adjustments on the skates at locations distant from home and access to tools. As a result, it would be highly desirable for the user to have on his or her person a lightweight tool which is readily accessible and capable of making ordinary adjustments to the inline skates.

Typical of the prior art in this regard are the disclosures of various configurations of screwdrivers and wrenches in the U.S. Pat. No. D49,037 issued to Parsons on May 9, 1916, U.S. Pat. No. 872,048 issued to Broad on Nov. 26, 1907, U.S. Pat. No. 1,167,542 issued to Bellows on Jan. 11, 1916, U.S. Pat. No. 1,442,184 issued to Smith on Jan. 16, 1923, and U.S. Pat. No. 4,631,770 issued to Goldberg on Dec. 30, 1986. In the Goldberg disclosure, a key ring is included for broadening the capability of that device.

The following U.S. patents disclose miniaturized tools for operating on recreational footgear: U.S. Pat. No. 4,504,993 issued to Gamble on Mar. 19, 1985, U.S. Pat. No. 4,774,736 issued to Brawner et al. on Oct. 4, 1988, U.S. Pat. No. 5,271,633 issued to Hill, Jr. On Dec. 21, 1993, and U.S. Pat. No. 5,365,811 issued to Chi on Nov. 22, 1994. Gamble discloses accessory tools which are installed directly on a skier's boot; Brawner et al. disclose a tool kit for a skateboard which is intended to be entrained on the belt of the skateboarder, and the tools of Hill, Jr. And Chi both relate to operations to be performed on inline roller skates.

The following U.S. patents disclose various combinations of rings, straps and the like attached to items such as keys, watches, and the like: U.S. Pat. No. D59,025 issued to McCullough on Sep. 13, 1921, U.S. Pat. No. 3,604,232 issued to Mosher on Sep. 14, 1971, U.S. Pat. No. 3,949,511 issued to Goldhaft on Apr. 13, 1976, U.S. Pat. No. 4,306,434 issued to Drake on Dec. 22, 1981, and U.S. Pat. No. 4,489,867 issued to Schwemberger on Dec. 25, 1984. In the instances, at least, of Mosher, Drake, and Schwemberger, the rings, straps, and the like are releasably attachable to the person or clothing of the user.

It was in light of the foregoing that the present invention was conceived and is now hereby reduced to practice.

SUMMARY OF THE INVENTION

The present invention relates to a skate key assembly for adjusting the wheels of an inline skate comprises an elongated one-piece key member of uniform hexagonal cross section including an intermediate S-shaped gripping member extending in one direction to a generally straight operating portion having a terminal end for insertion into the tightening mechanism of a wheel of the inline skate and extending in an opposite direction to an attachment portion oriented generally transverse of said operating portion. A carrier device in the form of a snap hook releasably attaches the assembly to the clothing of a user. A side release buckle includes a first buckle component attached to the carrier device, a second buckle component attached to the attachment portion of the key member, and an engagement mechanism selectively operable for releasably attaching the first buckle component to the second buckle component. The engagement mechanism is operable in one instance to attach the second buckle component to the first buckle component thereby safely attaching the key member to the clothing of the user and is operable in another instance to release the second buckle component from the first buckle component thereby freeing the key member for use in adjusting the wheels of the inline skate.

According to the invention, the S-shaped gripping member, the operating portion, and the attachment portion all lie in a substantially flat plane. The key member has a longitudinally extending operating axis about which it is rotated for adjusting the wheels of the inline skates, the operating portion being aligned with the operating axis. The S-shaped gripping member includes legs which extend transverse of the operating axis and are integrally joined together and to the operating portion and to the attachment portion at bight elements laterally distant from the operating axis, the attachment portion extending substantially perpendicular to the operating axis.

The carrier device includes a hook member and an integral snap closure united to the hook member by a living hinge and has a hinge recess adjacent the living hinge and a split ring slidably received in the hinge recess for hinged attachment to the hook member and snap closure. Further, the first buckle component includes a flexible strap having a distal loop fixed thereto and a proximal loop slidably receiving therein the split ring. The second buckle component similarly includes a flexible strap having a proximal loop fixed thereto and a distal loop sidably receiving the attachment portion of the key member.

The skate key and assembly of the invention have been designed to be an on-the-go accessory for use by inline skaters to tighten, rotate, or otherwise adjust their inline skate wheels. There are other markets, also, within the sporting goods industry where a tool such as this would be used, for example, biking.

The invention includes the combination of a web and buckle assembly that loops around a bent extruded $5/32$-inch hex steel key, with a snap hook and split key ring attached in the same manner from the opposite end, creating a fuill assembly. The snap hook allows the user to attach the assembly to the person of the user, thus making the tool "on-the-go". By having a split key ring attached on the snap hook end, the product has a dual function of being able to put door and other keys on the same assembly. This provides an added convenience to the user.

By incorporating a side-release buckle with the invention, the user has the ability to detach the tool without detaching the full assembly (possibly including house, car, or other keys) from a belt loop or other item of clothing.

The bent extruded key of hexagonal cross section, is preferably heat treated steel and coated with a black oxide finish for increased durability. Being steel, the key lends itself to be bent into many shapes, and, for purposes of the invention, is bent into an aesthetically pleasing, ergonomic form that is user-friendly. The shape provides for a forefinger and thumb hold or grip which allows for comfort and leverage for the user's hand during use. The shape is appropriately proportioned to be used in the manner of a key.

The leverage, or torque, is maximized in the width of the bent shape without distorting the aesthetics of the tool.

The features and benefits of the invention are numerous.

A primary feature of the invention is the provision of an inline skate key assembly which is a carry-with-you, easy-to-use skate tool which is normally attached to the person or clothing of the user and is detachable allowing the skater to use the tool easily during the course of the activity.

Another feature of the invention is the provision of an assembly which includes a snap hook on one end that allows the user to carry the tool assembly on his or her person or clothing the activity just by hooking it onto a belt loop or waist band, or other item of clothing.

Still another feature of the invention, by reason of its portability, resides in the ability of the user to use the skate key in the course of the inline skating activity by easily detaching it from his or her person by pressing the side release buckle.

Yet another feature of the skate key assembly invention is that it offers the user the ability to tighten the wheels of the inline skate when distant from home inasmuch as the wheels can loosen during the activity.

Still a further feature of the invention is that it provides the user with the ability to periodically rotate the relative positions of the inline skate wheels inasmuch as skate wheels wear down on their sides during use and periodically need replacement, such rotation helping to increase the life of the wheels prior to their replacement. Still another feature of the invention is that the hex skate key is bent into a friendly, ergonomic shape that allows the user to have better grip control of it during use, functioning more like a standard key than a typical L-shaped hexagonal wrench. For example, if the short end of a typical L-wrench is inserted into the hex bolt on an inline skate, the long end of the L-wrench would strike the skate boot at each turn, periodically requiring its removal and re-setting. The invention enables continuous turning without requiring resetting of the key.

A further feature of the invention resides in the construction of the assembly which includes a split ring such that it has a dual function, that is, it can also be used as a key chain enabling the user to attach his or keys to the same assembly.

Yet a further feature of the skate key assembly of the invention is the fact that it is attractive and can serve as a fashion accessory that makes a personal statement informing others that the hobby or preferred sporting activity of the wearer is inline skating.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENT

Figure 1:
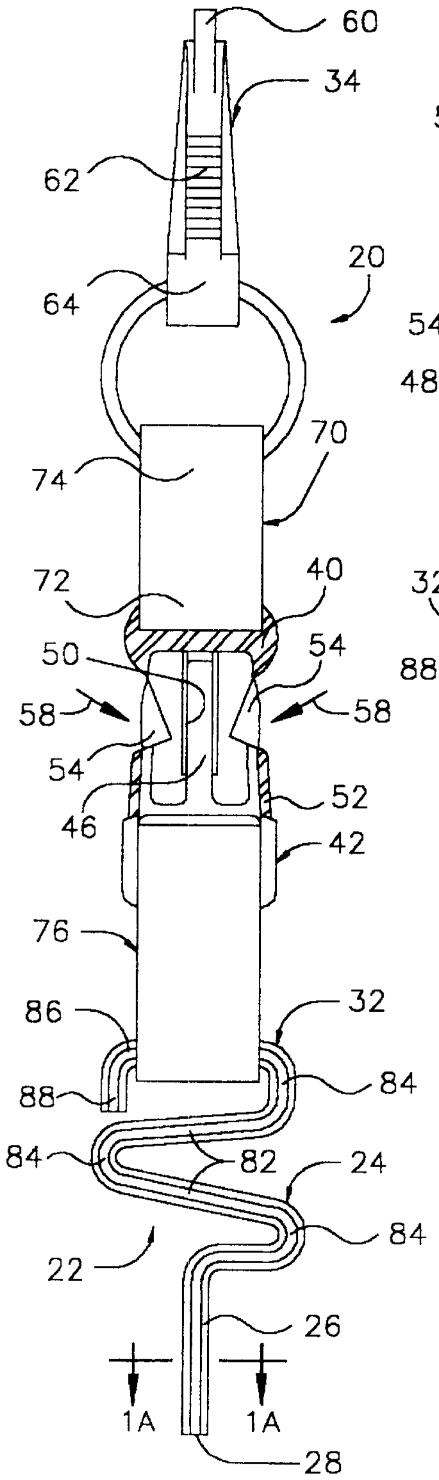
FIG. 1 is a front elevation view of an inline skate key assembly embodying the present invention.
Figure 2:
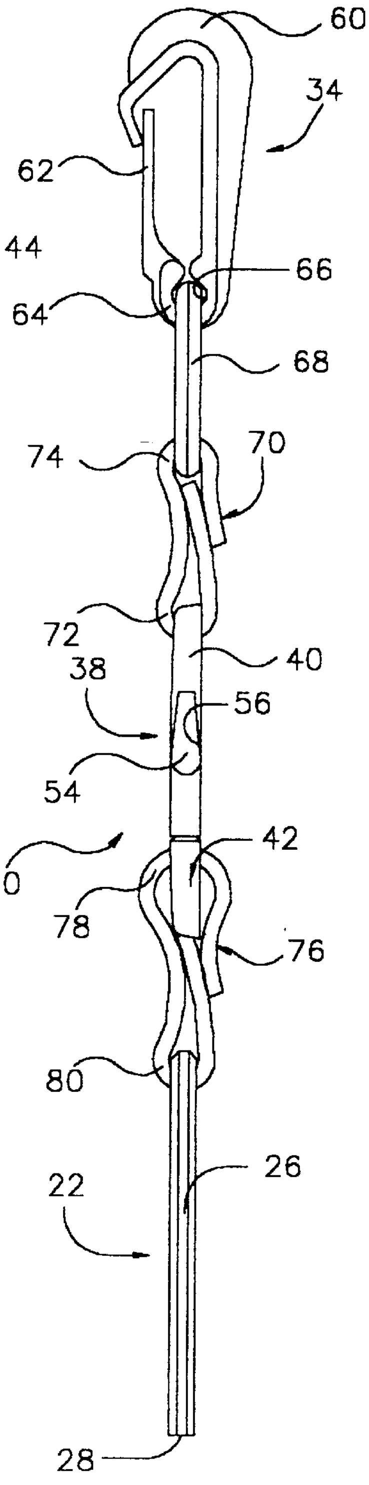
FIG. 2 is a side elevation view of the inline skate key assembly illustrated in FIG. 1.
Figure 3:
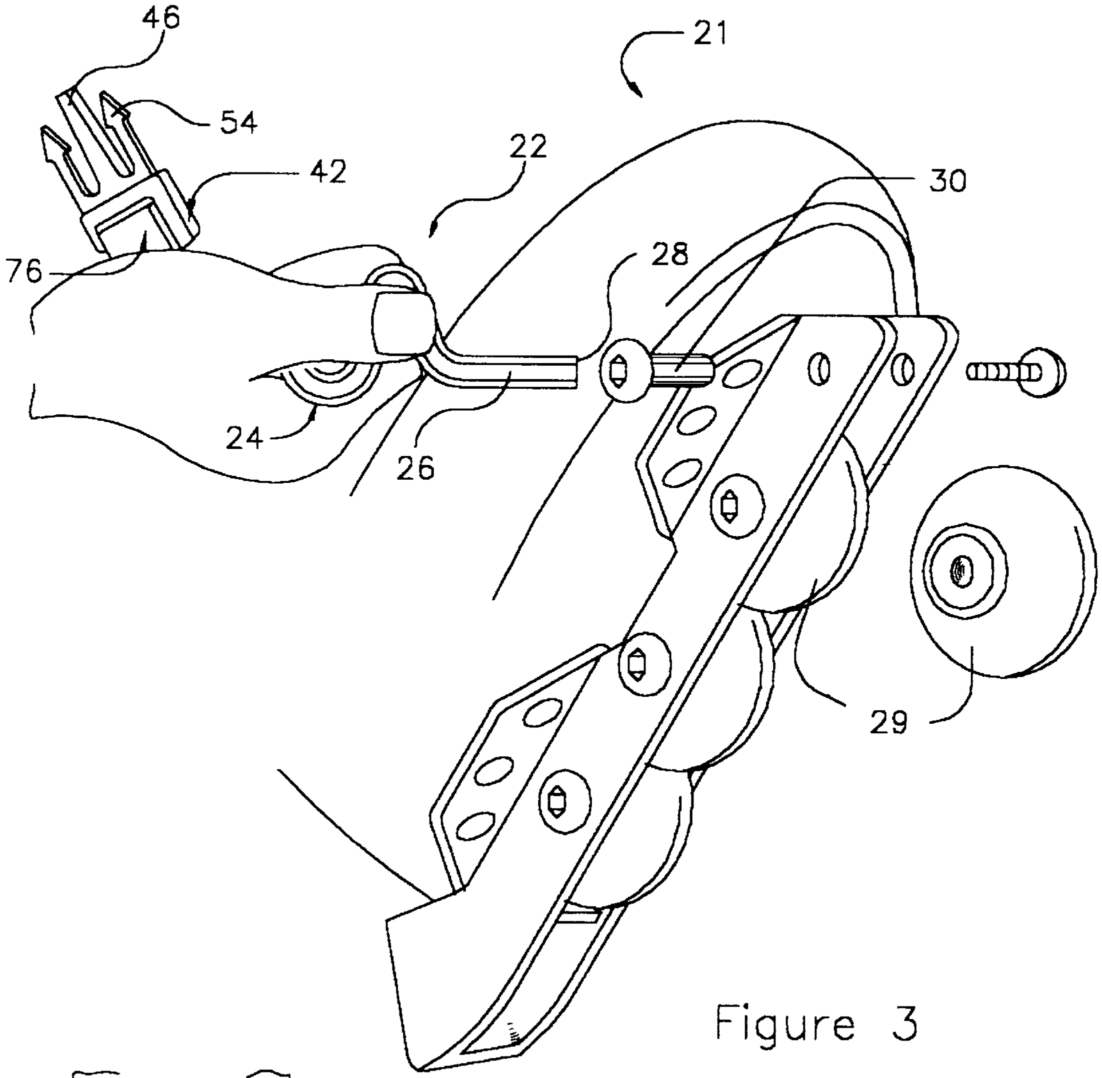
FIG. 3 is a perspective view illustrating the use of the inline skate key assembly on an inline skate.
Figure 4:
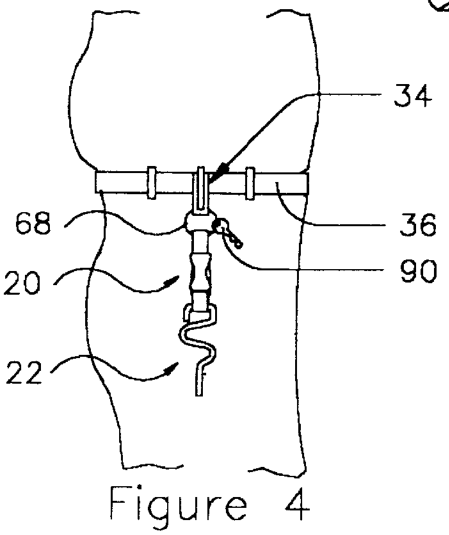
FIG. 4 is a perspective view illustrating the inline skate key assembly of FIGS. 1 and 2 suspended from the user's clothing.
Figure 4A:
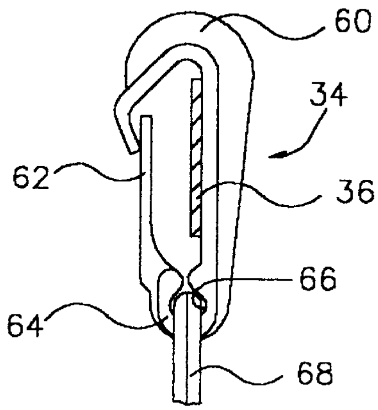
FIG. 4A is a detail side elevation view of certain parts illustrated in FIG. 2, certain parts being shown in section.

Turn now to the drawings and, initially, to FIGS. 1 and 2 which generally illustrate a skate key assembly 20 embodying the present invention for adjusting the wheels of an inline skate 21 (FIG. 3).

The skate key assembly 20 includes an elongated one-piece key member 22 of hexagonal cross section (FIG. 1A) including an intermediate S-shaped gripping member 24 extending in one direction to a generally straight operating portion 26 having a terminal end 28 for insertion into the tightening mechanism of a wheel 29 (FIG. 3) of the inline skate. For simplicity, the tightening mechanism is represented by a fastener 30. The gripping member 24 extends in an opposite direction to an attachment portion 32 oriented generally transverse of the operating portion 26. The key member 22 is preferably of uniform cross section for its entire length from the attachment portion 32 to the terminal end 28. Indeed, the key member 22 may be formed from a conventional L-shaped hex tool. For achieving an optimum ergonomic effect, the S-shaped gripping member 24, the operating portion 26, and the attachment portion 32 all lie in a substantially flat plane (see FIG. 2).

Viewing FIGS. 1, 2, 4, and 4A, a carrier member 34 is releasably attachable to the clothing of a user, for example, to a belt 36.

A side release buckle mechanism 38 includes a first buckle component 40 attached to the carrier member 34, a second buckle component 42 attached to the attachment portion 32 of the key member 22, and an engagement mechanism 44 (FIG. 1B) selectively operable for releasably attaching the first buckle component to the second buckle component.

Figure 1B:
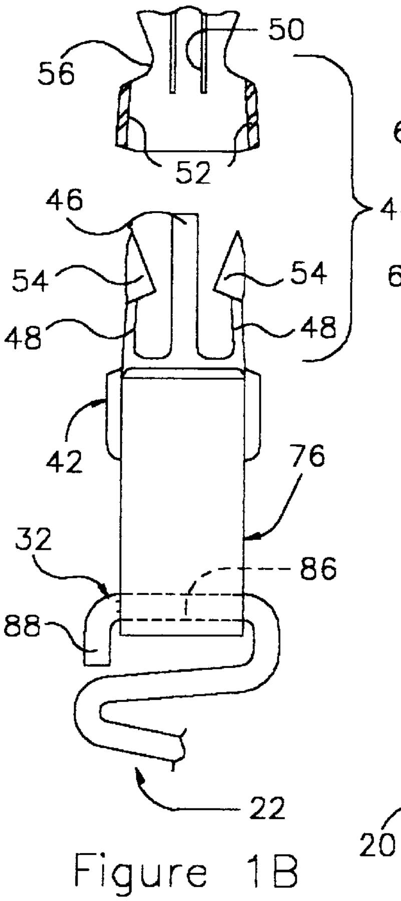
FIG. 1B is an exploded front elevation view of parts illustrated in FIG. 1.
Figure 1A:
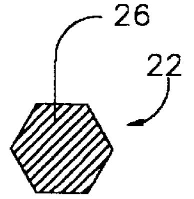
FIG. 1A is a cross section view taken generally along line 1A—1A in FIG. 1.

The engagement mechanism 44 is of a known construction. Integral with, and projecting from a proximal end of the buckle component 42 are a centrally disposed and longitudinally extending guide finger 46 flanked by a pair of engagement prongs 48. When the buckle component 42 is moved into engagement with the buckle component 40 as seen in FIG. 1B, the guide finger 46 enters, and is guided by, a channel 50. The engagement prongs 48 are biased outwardly so they engage outer walls 52 of the buckle component 40 until extreme head members 54 project through opposed lateral openings 56 and snap into engagement with the side walls 52 which thereafter prevent withdrawal of the buckle component 42 from the buckle component 40. Thus, the engagement mechanism 44 is operable in one instance to attach the second buckle component 42 to the first buckle component 40 thereby safely attaching the key member 22 to the clothing of the user. The engagement mechanism is also operable in another instance to release the second buckle component 42 from the first buckle component to thereby free the key member for use in adjusting the wheels of the inline skate. This occurs when the extreme head members 54 are pressed inwardly in the direction of arrows 58 (FIG. 1) so that they are disengaged from the side walls 52 and allow the withdrawal of the buckle component 42 from the buckle component 40.

The carrier member 34 includes a hook member 60 and an integral snap closure 62 united to the hook member by a living hinge 64 and has a hinge recess 66 adjacent the living hinge and a split ring 68 is slidably received in the hinge recess for hinged attachment to the carrier member. The first buckle component 40 includes a flexible strap 70 of suitable material having a distal loop 72 fixed thereto and a proximal loop 74 slidably receiving the split ring 68 therein. The second buckle component 42 likewise includes a flexible strap 76 having a proximal loop 78 fixed thereto and a distal loop 80 slidably receiving the attachment portion 32 of the key member 22.

The key member 22 has a longitudinally extending operating axis about which it is rotated for adjusting the wheels 29 of the inline skate 21 (FIG. 3), the operating portion 26 being aligned with the operating axis. The S-shaped gripping member 24 includes gripper legs 82 which extend transverse of the operating axds and are integrally joined together and to the operating portion 26 and to the attachment portion 32 at bight elements 84 laterally distant from the operating axis. The attachment portion 32 includes an attachment leg 86 extending substantially perpendicular to the operating axis and a terminal leg 88 extending from the attachment leg generally parallel to the operating axis and proximately spaced from an adjacent one of the gripper legs 82.

Desirably, a door key 90, or multiple keys, may be removably attached to the split ring 68 in the known manner. By reason of the design of the invention, however, the key member 22 may be removed from the belt 36 and used on the inline skate 21 without affecting the door key 90 or whatever keys are held on the split ring 68.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A hand tool for adjusting the wheels of an inline skate, said hand tool comprising:

(a) an elongated one piece skate key, said skate key having a longitudinal operating axis about which said skate key is rotated for adjusting said wheels of said inline skate, said skate key comprising:
   (i) a terminal end configured to fit an adjustment member of said wheels of said inline skate, said terminal end extending in the direction of said operating axis;
   (ii) an intermediate gripping portion, said gripping portion being curved to define at least one grippable leg which extends at an angle from said operating axis and is integrally joined together at bight elements laterally distant from said operating axis; and
   (iii) an attachment portion, said attachment portion being oriented generally transverse to said operating axis;

(b) a releasable buckling member having a first buckle portion and a second buckle portion, said first buckle portion and said second buckle portion together having separable cooperating receptable and clasp members, said first buckle portion being further configured to receive said attachment portion of said skate key, said separable cooperating receptable and clasp members being selectively operable to be moved from a first configuration where said receptable is engaged with said clasp to a second position where said clasp is separated from said receptable thereby freeing said skate key for use in adjusting said wheel of said inline skate; and (c) a carrier member having an upper portion and a lower portion, said upper portion adapted to be releasably attachable to the user of said hand tool, and said lower portion adpated to be fastened to said second buckle portion of said releasable buckling member.

2. A hand tool as claimed in claim 1, wherein said skate key has a uniform cross section throughout its length, said uniform cross section configured to fit said wheel adjustment member.

3. A hand tool as claimed in claim 1, wherein said grippable legs are positioned at a distance from said terminal end such as to permit continuous rotation of said skate key when said terminal end of said skate key is engaged with said adjustment member of said wheel.

4. A hand tool as claimed in claim 1, wherein said upper portion of said carrier member includes a snap hook for releasable attachment to the clothing of the user.

5. A hand tool as claimed in claim 1, wherein said skate key is a unitary structure formed out of hexagonal bar stock.

6. A hand tool for adjusting the wheels of an inline skate, said hand tool comprising:

(a) an elongated one piece skate key of uniform hexagonal cross section, said skate key having a longitudinal operating axis about which said skate key is rotated for adjusting said wheels of the inline skate, said skate key comprising:
   (i) a terminal end having a cross sectional shape adapted to fit an adjustment member of said wheels of an inline skate, said terminal end extending in the direction of said operating axis;
   (ii) an intermediate S-shaped gripping portion, said S-shaped gripping portion having grippable legs which are transverse to said operating axis and are integrally joined together at bight elements laterally distant from said operating axis, said grippable legs being positioned at a distance from said terminal end such that continuous rotation of said skate key is allowed when said terminal end of said skate key is engaged with said adjustment member of said wheel; and
   (iii) an attachment portion, said attachment portion being oriented generally transverse to said operating axis, said terminal end, said intermediate S-shaped gripping member and said attachment portion having a uniform cross sectional shape;

(b) a releasable buckling member having a first buckle portion and a second buckle portion, said first buckle portion and said second buckle portion each having separable cooperating receptacle and clasp members, said first buckle portion being further configured to receive said attachment portion of said skate key, said separable cooperating receptacle and clasp members being selectively operable to allow the user of said hand tool the ability to separate said first buckle portion and said skate key from said second buckle portion thereby freeing said skate key for use in adjusting said wheel of an inline skate; and (c) a carrier member having an upper portion and a lower portion, said upper portion adapted to be releasably attachable to the user of said hand tool, said lower portion adapted to be fastened to said second buckle portion of said releasable buckling member.

* * * * *